United States Patent
Yahagi

(10) Patent No.: US 10,131,351 B2
(45) Date of Patent: Nov. 20, 2018

(54) CONTROL DEVICE FOR CONTINUOUSLY VARIABLE TRANSMISSION

(71) Applicant: SUBARU CORPORATION, Tokyo (JP)

(72) Inventor: Hiromichi Yahagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 34 days.

(21) Appl. No.: 15/498,257

(22) Filed: Apr. 26, 2017

(65) Prior Publication Data

US 2017/0334445 A1 Nov. 23, 2017

(30) Foreign Application Priority Data

May 19, 2016 (JP) .................................. 2016-100140

(51) Int. Cl.
*B60W 10/107* (2012.01)
*B60W 30/14* (2006.01)
(Continued)

(52) U.S. Cl.
CPC ............. *B60W 30/143* (2013.01); *B60K 6/40* (2013.01); *B60K 6/48* (2013.01); *B60K 6/543* (2013.01);
(Continued)

(58) Field of Classification Search
CPC ......... Y10T 477/6237; Y10T 477/6223; Y10T 477/688; Y10T 477/676; Y10T 477/68;
(Continued)

(56) References Cited

U.S. PATENT DOCUMENTS

| 5,033,571 A | * | 7/1991 | Morimoto | ............ | B60K 31/047 180/176 |
| 5,217,086 A | * | 6/1993 | Morimoto | ............ | B60K 31/045 180/177 |

(Continued)

FOREIGN PATENT DOCUMENTS

| JP | 2004-52989 A | 2/2004 |
| JP | 2004-142702 A | 5/2004 |

(Continued)

OTHER PUBLICATIONS

JPO Decision to Grant a Patent dated Feb. 27, 2018 in Japanese Application No. 2016-100140.

*Primary Examiner* — Roger L Pang
(74) *Attorney, Agent, or Firm* — McGinn IP Law Group, PLLC.

(57) ABSTRACT

A control device for a continuously variable transmission includes first, second, and third controllers. The first controller controls, in response to a first speed control request for controlling a traveling speed of a vehicle for a predetermined state, a gear ratio of the continuously variable transmission such that a rotational speed of a drive power source approaches a set rotational speed. The second controller controls, in response to a second speed control request issued while the first controller is controlling the gear ratio, the gear ratio based on the rotational speed and the gear ratio. The third controller changes, when the rotational speed changes as a result of the second controller controlling the gear ratio, torque of the drive power source based on torque and the rotational speed of the drive power source before the gear ratio is changed and a target rotational speed of the drive power source.

5 Claims, 4 Drawing Sheets

(51) Int. Cl.
  *B60W 10/06* (2006.01)
  *B60W 30/16* (2012.01)
  *B60W 30/188* (2012.01)
  *B60K 6/40* (2007.10)
  *B60K 6/48* (2007.10)
  *B60K 6/543* (2007.10)
  *B60W 10/08* (2006.01)
  *F16H 61/662* (2006.01)
  *B60W 20/30* (2016.01)

(52) U.S. Cl.
  CPC ............ B60W 10/06 (2013.01); B60W 10/08 (2013.01); B60W 10/107 (2013.01); B60W 20/30 (2013.01); B60W 30/16 (2013.01); B60W 30/188 (2013.01); F16H 61/662 (2013.01); *B60K 2006/4825* (2013.01); *B60W 2510/0638* (2013.01); *B60W 2510/104* (2013.01); *B60W 2510/1015* (2013.01); *B60W 2520/10* (2013.01); *B60W 2540/10* (2013.01); *B60W 2540/12* (2013.01); *B60W 2540/16* (2013.01); *B60W 2710/0644* (2013.01); *B60W 2710/0666* (2013.01); *B60W 2710/1005* (2013.01); *B60W 2720/10* (2013.01); *B60W 2750/308* (2013.01); *Y10T 477/6223* (2015.01); *Y10T 477/6237* (2015.01); *Y10T 477/676* (2015.01); *Y10T 477/68* (2015.01); *Y10T 477/688* (2015.01)

(58) Field of Classification Search
  CPC .... F16H 61/662; B60K 6/543; B60W 30/143; B60W 20/30; B60W 10/08; B60W 30/188; B60W 10/06; B60W 10/107; B60W 2540/10; B60W 2510/1015; B60W 2510/104; B60W 2520/10; B60W 2720/10; B60W 2710/1005; B60W 2710/0644; B60W 2710/0666; B60W 2510/0638
  See application file for complete search history.

(56) References Cited

U.S. PATENT DOCUMENTS 9,175,767 B2 * 11/2015 Yahagi ............... B60K 31/0058
9,630,623 B2 * 4/2017 Fairgrieve ............. B60L 3/106
2015/0088391 A1 3/2015 Ishikawa et al.

FOREIGN PATENT DOCUMENTS

| JP | 2015-58897 A | 3/2015 |
| JP | 2015-058897 A | 3/2015 |
| JP | 2016-60421 A | 4/2016 |

* cited by examiner

CONTROL DEVICE FOR CONTINUOUSLY VARIABLE TRANSMISSION

CROSS REFERENCE TO RELATED APPLICATIONS

The present application claims priority from Japanese Patent Application No. 2016-100140 filed on May 19, 2016, the entire contents of which are hereby incorporated by reference.

BACKGROUND

1. Technical Field

The present invention relates to a control device for a continuously variable transmission disposed between a drive power source and drive wheels of a vehicle.

2. Related Art

Japanese Unexamined Patent Application Publication (JP-A) No. 2015-58897 discloses a control device for a continuously variable transmission installed in a vehicle. In the vehicle of JP-A No. 2015-58897, motive power generated by an engine, which serves as a drive power source used for the vehicle to travel, is transmitted to drive wheels via a torque converter serving as a hydraulic power transmission, a forward-reverse switching unit, a belt-type continuously variable transmission, and a differential gear unit.

The vehicle is equipped with an electronic control unit for controlling the engine and the belt-type continuously variable transmission. The electronic control unit receives a signal from an engine rotational speed sensor, a signal from a sensor that detects a throttle opening of an electronic throttle valve, a signal from a sensor that detects an operation amount (accelerator opening) of an accelerator pedal, a signal from a sensor that detects the position of a select lever, signals from sensors that detect the rotational speed of an input shaft and the rotational speed of an output shaft of the belt-type continuously variable transmission, a signal from a vehicle speed sensor, etc.

The electronic control unit determines the target gear ratio on the basis of the accelerator opening and the vehicle speed and controls the gear ratio of the belt-type continuously variable transmission on the basis of the target gear ratio. The electronic control unit also performs control to decrease the engine torque in a transition period during upshifting of the belt-type continuously variable transmission. This control decreases a variation in torque of the output shaft due to a change in inertia torque during upshifting of the belt-type continuously variable transmission.

However, JP-A No. 2015-58897 includes no description about how the control device for a continuously variable control disclosed therein operates in response to a second speed control request different from a first speed control request when the control device is handling the first speed control request for controlling the traveling speed of the vehicle for a predetermined state. Therefore, the ride comfort of the vehicle possibly decreases.

SUMMARY OF THE INVENTION

It is desirable to provide a control device for a continuously variable transmission, capable of suppressing a decrease in ride comfort of a vehicle in the case where a second speed control request different from a first speed control request occurs when the control device is handling the first speed control request for controlling the traveling speed of the vehicle for a predetermined state.

An aspect of the present invention provides a control device for a continuously variable transmission configured to continuously change a gear ratio. The continuously variable transmission is disposed between a drive power source and drive wheels of a vehicle. The drive power source is configured to transmit motive power to the drive wheels. The control device includes a first controller, a second controller, and a third controller. The first controller is configured to control, in response to a first speed control request for controlling a traveling speed of the vehicle for a predetermined state, the gear ratio of the continuously variable transmission such that a rotational speed of the drive power source approaches a set rotational speed. The second controller is configured to control, in response to a second speed control request that is different from the first speed control request and is issued while the first controller is controlling the gear ratio of the continuously variable transmission in accordance with the first speed control request, the gear ratio of the continuously variable transmission on the basis of the rotational speed of the drive power source and the gear ratio of the continuously variable transmission. The third controller is configured to change, when the rotational speed of the drive power source changes as a result of the second controller controlling the gear ratio of the continuously variable transmission, torque of the drive power source on the basis of torque of the drive power source before the gear ratio of the continuously variable transmission is changed, the rotational speed of the drive power source before the gear ratio of the continuously variable transmission is changed, and a target rotational speed of the drive power source.

DETAILED DESCRIPTION

Examples of a control device for a continuously variable transmission will be described in detail below with reference to the accompanying drawings.

Figure 1:
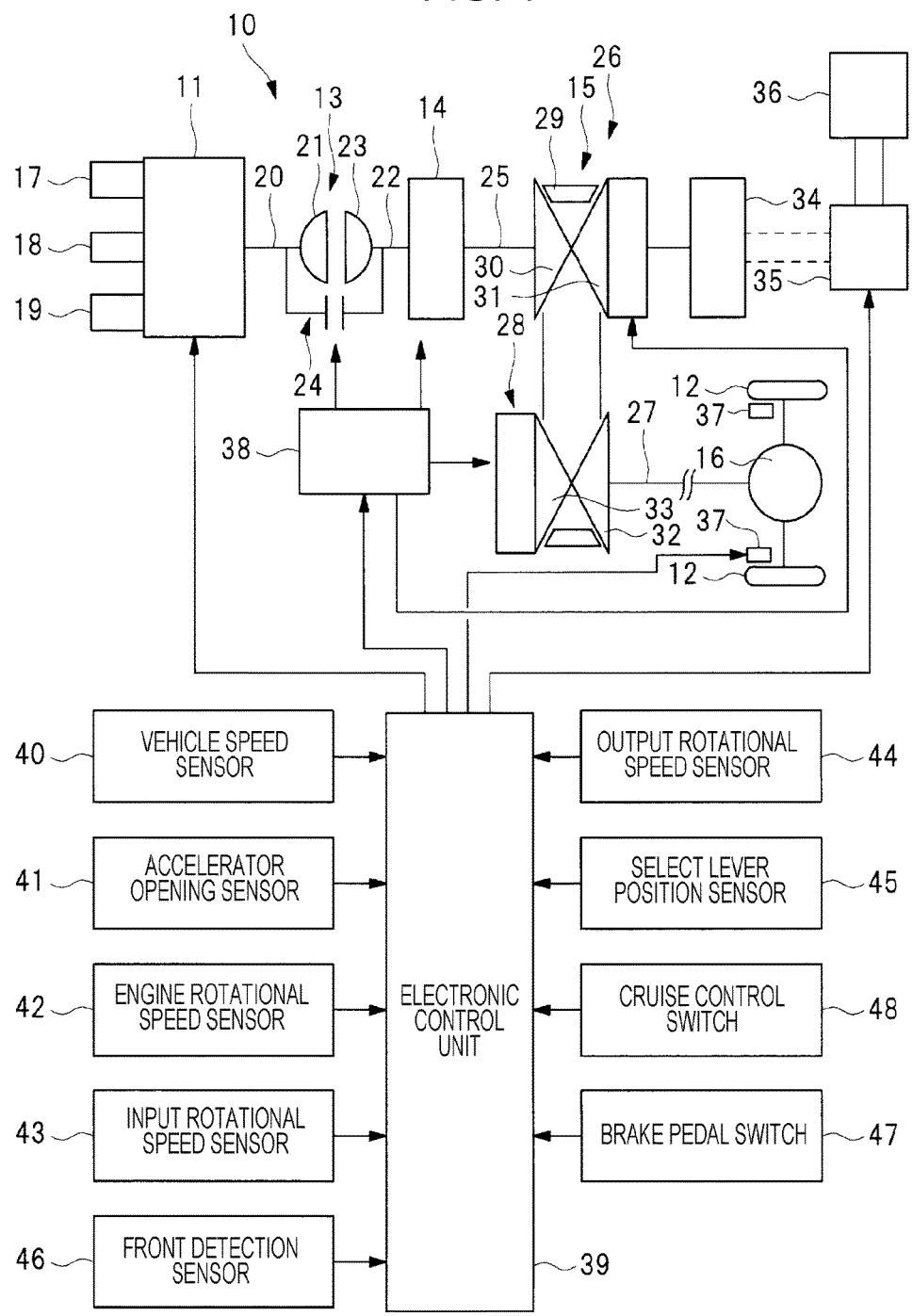
FIG. 1 is a schematic diagram illustrating a vehicle including a continuously variable transmission.

A vehicle 10 illustrated in FIG. 1 is equipped with a hydraulic power transmission 13, a forward-reverse switching unit 14, a continuously variable transmission 15, and a differential 16 along a power transmission path from an engine 11 to drive wheels 12. The engine 11 is a drive power source that converts thermal energy obtained by combustion of a fuel-air mixture in a combustion chamber into kinetic energy. A description will be given herein on the assumption that the engine 11 is a gasoline engine. The engine 11 includes an electronic throttle valve 17 disposed at an intake manifold, an injector 18 that squirts fuel into the intake manifold, and a spark plug 19 that ignites the fuel-air mixture in the combustion chamber. The electronic throttle valve 17 controls the amount of air flowing into the combustion chamber via the intake manifold.

The hydraulic power transmission 13 is a torque converter including a pump impeller 21 coupled to a crankshaft 20 of the engine 11, a turbine runner 23 coupled to a motive power transmission member 22, and a stator. The torque converter also includes a lockup clutch 24 that connects the crankshaft 20 and the motive power transmission member 22. Engagement and disengagement of the lockup clutch 24 is hydraulically controlled.

The forward-reverse switching unit 14 is disposed between the motive power transmission member 22 and an input element 25 of the continuously variable transmission 15. The forward-reverse switching unit 14 is a mechanism that switches the rotation direction of the input element 25 with respect to the motive power transmission member 22 between the forward direction and the reverse direction. The forward-reverse switching unit 14 includes a planetary pinion mechanism and a frictional engagement device. The forward-reverse switching unit 14 can switch the rotation direction of the input element 25 with respect to the motive power transmission member 22 between the forward direction and the reverse direction by hydraulically controlling the frictional engagement device.

The continuously variable transmission 15 includes a primary pulley 26 provided at the input element 25, a secondary pulley 28 provided at an output element 27, and an endless belt 29 wound around the primary pulley 26 and the secondary pulley 28. The primary pulley 26 includes a first fixed sheave 30 and a first movable sheave 31. The secondary pulley 28 includes a second fixed sheave 32 and a second movable sheave 33. Each of the first movable sheave 31 and the second movable sheave 33 moves along the direction of the center line by hydraulic control. As a result of the first movable sheave 31 moving along the center line of the input element 25, the groove width of the primary pulley 26 is changed. As a result of the second movable sheave 33 moving along the center line of the output element 27, clamping pressure applied to the belt 29 by the secondary pulley 28 is changed.

When the groove width of the primary pulley 26 is decreased as a result of movement of the first movable sheave 31, shifting for decreasing the gear ratio of the continuously variable transmission 15 (i.e., upshifting) is performed. When the groove width of the primary pulley 26 is increased as a result of movement of the first movable sheave 31, shifting for increasing the gear ratio of the continuously variable transmission 15 (i.e., downshifting) is performed. The continuously variable transmission 15 is capable of continuously changing the gear ratio between the input element 25 and the output element 27. When the clamping pressure applied to the belt 29 by the secondary pulley 28 increases, torque capacity of the continuously variable transmission 15 increases. When the clamping pressure applied to the belt 29 by the secondary pulley 28 decreases, torque capacity of the continuously variable transmission 15 decreases.

The vehicle 10 is equipped with a motor-generator 34 coupled to the input element 25 in a motive power transmittable manner. The motor-generator 34 is coupled to a battery 36 with an inverter 35 interposed therebetween. Upon being supplied with electric power from the battery 36, the motor-generator 34 functions as a motor. The motor-generator 34 also has a function of converting motive power of the input element 25 into electric power, and the inverter 35 has a function of charging the battery 36 with the electric power. That is, the motor-generator 34 is also capable of producing regenerative brake force and applying the brake force to the drive wheels 12. The vehicle 10 is a hybrid vehicle including a plurality of kinds of drive power sources, that is, the engine 11 and the motor-generator 34.

The differential 16 is coupled to the output element 27. The differential 16 transmits motive power from the continuously variable transmission 15 to the left and right drive wheels 12. The differential 16 allows different rotational speeds of the left and right drive wheels 12. The vehicle 10 is equipped with braking devices 37 that apply brake force to the respective drive wheels 12. The braking devices 37 hydraulically control the brake force. The brake force produced by the braking devices 37 can be controlled on the basis of an operation amount of a brake pedal and also on the basis of conditions other than the operation amount of the brake pedal.

The vehicle 10 is equipped with a hydraulic control unit 38 that separately controls engagement and disengagement of the lockup clutch 24, engagement and disengagement of the frictional engagement device of the forward-reverse switching unit 14, and operations of the first movable sheave 31 and the second movable sheave 33 of the continuously variable transmission 15. The hydraulic control unit 38 includes a valve for switching between engagement and disengagement of the lockup clutch 24, a valve for switching between engagement and disengagement of the frictional engagement device of the forward-reverse switching unit 14, and a valve for controlling the first movable sheave 31 and the second movable sheave 33.

The vehicle 10 is equipped with an electronic control unit 39 that controls output of the engine 11, controls the hydraulic control unit 38, controls the inverter 35, and controls brake force produced by the braking devices 37. The electronic control unit 39 is a microcomputer including an input interface, an output interface, a central processing unit, and a storage device. The storage device stores various kinds of information, such as information used to control output of the engine 11, information used to control engagement and disengagement of the lockup clutch 24, information used to control the gear ratio and the torque capacity of the continuously variable transmission 15, information used to control the motor-generator 34, and information used to control the brake force produced by the braking devices 37. These kinds of information include maps and calculation expressions, for instance.

The electronic control unit 39 receives signals, such as a signal from a vehicle speed sensor 40, a signal from an accelerator opening sensor 41, a signal from an engine rotational speed sensor 42, a signal from an input rotational speed sensor 43, a signal from an output rotational speed sensor 44, a signal from a select lever position sensor 45, a signal from a front detection sensor 46, a signal from a brake pedal switch 47, and a signal from a cruise control switch 48. The vehicle speed sensor 40 detects the traveling speed of the vehicle 10. The accelerator opening sensor 41 detects an amount of operation performed on an operation member (e.g., an accelerator pedal operated by a driver of the vehicle 10 with their foot), which represents an acceleration request input by the driver to the vehicle 10. The brake pedal switch 47 detects an amount of operation performed on an operation member (i.e., a brake pedal), which represents a braking request input by the driver to the vehicle 10.

The input rotational speed sensor 43 detects the rotational speed of the input element 25 of the continuously variable transmission 15. The output rotational speed sensor 44 detects the rotational speed of the output element 27 of the continuously variable transmission 15. The select lever position sensor 45 detects the operation state of a selection device operated by the driver of the vehicle 10, that is, whether the forward direction or the reverse direction is selected as the traveling direction of the vehicle 10. The front detection sensor 46 detects a situation in front of the vehicle 10. Types of the front detection sensor 46 include a camera, a millimeter-wave radar, and an infrared laser, for instance. The electronic control unit 39 processes the signal from the front detection sensor 46 to determine whether there is a preceding vehicle and determine a vehicle-to-vehicle distance between the preceding vehicle and the vehicle 10, for instant. The preceding vehicle is a vehicle that is located in front of the vehicle 10 in the traveling direction of the vehicle 10 within a predetermined distance from the vehicle 10. The predetermined distance is a threshold that is set on the basis of conditions, such as the detection accuracy of the front detection sensor 46.

The cruise control switch 48 is operated by the driver to activate and deactivate the cruise control function for controlling the traveling speed of the vehicle 10 for a predetermined state. Types of the cruise control switch 48 include a button, a lever, and a liquid crystal panel, for instance. When the cruise control switch 48 is switched ON, the electronic control unit 39 activates the cruise control function. When the cruise control switch 48 is switched OFF, the electronic control unit 39 deactivates the cruise control function. The cruise control function includes constant-speed cruise control for keeping the traveling speed of the vehicle 10 at a constant speed and follow cruise control for keeping the vehicle-to-vehicle distance between the preceding vehicle and the vehicle 10 at a constant distance. At the time of activation of the cruise control function, the driver can select a set vehicle speed used in the constant-speed cruise control and a set vehicle-to-vehicle distance used in the follow cruise control.

When the cruise control function is OFF, the electronic control unit 39 controls the engine 11, the continuously variable transmission 15, and the motor-generator 34 on the basis of the vehicle speed, the accelerator opening, and the information stored in the storage device. For instance, the electronic control unit 39 determines target drive power of the vehicle 10 on the basis of the vehicle speed and the accelerator opening. The electronic control unit 39 then determines a target engine rotational speed and a target engine torque that correspond to the target drive power and determines a target rotational speed and a target torque of the motor-generator 34. The electronic control unit 39 also determines a target gear ratio of the continuously variable transmission 15 in accordance with the target engine rotational speed. The target rotational speed and the target torque of the engine 11, the target gear ratio of the continuously variable transmission 15, and the target rotational speed and the target torque of the motor-generator 34 are associated as an information set by taking fuel consumption of the engine 11 into account and are stored in the electronic control unit 39, for instance.

The electronic control unit 39 controls at least one of the electronic throttle valve 17, the injector 18, or the spark plug 19 to control the engine torque to approach the target engine torque. The electronic control unit 39 also controls the gear ratio of the continuously variable transmission 15 to control the engine rotational speed to approach the target engine rotational speed. The electronic control unit 39 further controls output of the motor-generator 34. Upon the brake pedal being operated while the vehicle 10 is traveling, the braking devices 37 apply brake force to the respective drive wheels 12.

When the cruise control function is activated, the electronic control unit 39 processes the signal from the front detection sensor 46 and detects information regarding the preceding vehicle. The electronic control unit 39 is capable of detecting the presence or absence of the preceding vehicle, the vehicle-to-vehicle distance between the preceding vehicle and the vehicle 10, and the difference between vehicle speeds of the preceding vehicle and the vehicle 10, for instance. When there is no preceding vehicle in front of the vehicle 10, the electronic control unit 39 controls the traveling speed of the vehicle 10 such that the set vehicle speed is maintained.

In contrast, when there is a preceding vehicle in front of the vehicle 10, the electronic control unit 39 controls the vehicle speed of the vehicle 10 such that the set vehicle-to-vehicle distance is maintained while keeping the vehicle speed at the set vehicle speed or lower. When the cruise control function is active, the electronic control unit 39 determines the set engine torque, the set engine rotational speed, the set gear ratio, the set output of the motor-generator 34, and the set brake force to be produced by the braking devices 37, in accordance with the set vehicle speed and the set vehicle-to-vehicle distance.

As described above, when the cruise control function is active, the engine rotational speed, the gear ratio of the continuously variable transmission 15, the engine torque, the output of the motor-generator 34, and the brake force of the braking devices 37 are controlled on the basis of conditions other than the operation amount of the accelerator pedal or the operation amount of the brake pedal.

First Control Example

Figure 2:
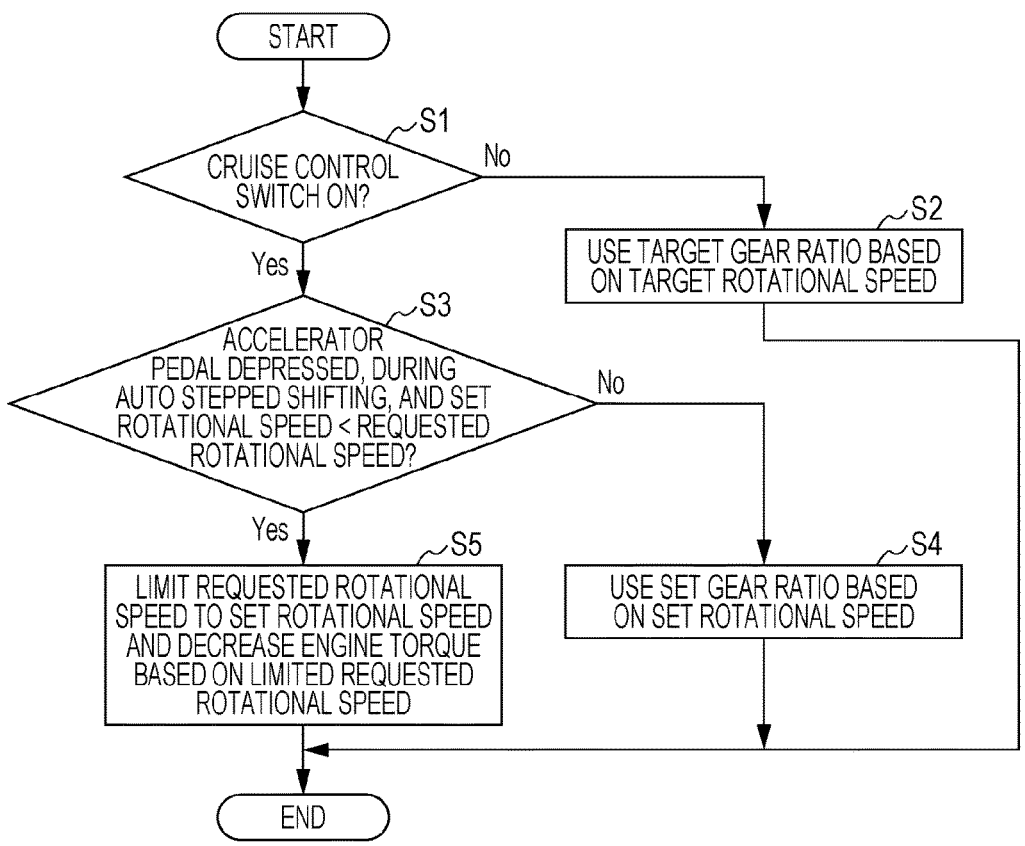
FIG. 2 is a flowchart illustrating control performed by an electronic control unit of a vehicle.

A first control example performed by the electronic control unit 39 in relation to the cruise control function will be described with reference to a flowchart of FIG. 2. Control described with reference to the flowchart of FIG. 2 is mainly regarding the engine rotational speed, the gear ratio of the continuously variable transmission 15, and the engine torque.

In step S1, the electronic control unit 39 determines whether the cruise control switch 48 is ON. If the electronic control unit 39 detects that the cruise control switch 48 is OFF (No in step S1), the process proceeds to step S2. In step S2, the electronic control unit 39 controls the gear ratio of the continuously variable transmission 15 on the basis of the target gear ratio corresponding to the target engine rotational speed and terminates the flowchart of FIG. 2. That is, in step S2, the electronic control unit 39 controls the gear ratio of the continuously variable transmission 15 by preferentially taking the fuel consumption of the engine 11 into account and does not use the set engine rotational speed for the control.

If the electronic control unit 39 detects that the cruise control switch 48 is ON (Yes in step S1), the process proceeds to step S3. In step S3, the electronic control unit 39 determines whether automatic stepped shifting is being performed by the continuously variable transmission 15 in response to an increase in a depression amount of the accelerator pedal and whether the requested engine rotational speed has exceeded the set engine rotational speed.

The increasing depression amount of the accelerator pedal indicates that an acceleration request is input to the vehicle 10. The requested engine rotational speed is a value based on the increased operation amount of the accelerator pedal and is higher than the set engine rotational speed. The engine rotational speed increases in accordance with the requested engine rotational speed. Automatic stepped shifting of the continuously variable transmission 15 is upshifting performed by the electronic control unit 39 by selecting, as the target gear ratio, one of a plurality of fixed gear ratios stored in advance in the electronic control unit 39 on the basis of the engine rotational speed, the gear ratio of the continuously variable transmission 15, the accelerator opening, and so forth. Automatic stepped shifting is control with which shifting is performed as in traditional transmissions by performing shifting control using a fixed gear ratio as the target gear ratio.

If the electronic control unit 39 determines No in step S3, the process proceeds to step S4. In step S4, the electronic control unit 39 controls the gear ratio of the continuously variable transmission 15 on the basis of the set gear ratio corresponding to the set engine rotational speed and terminates the flowchart of FIG. 2. After the electronic control unit 39 performs the processing of step S4, the engine rotational speed is maintained at the set engine rotational speed. That is, the traveling speed of the vehicle 10 is maintained at the set vehicle speed and the vehicle-to-vehicle distance between the preceding vehicle and the vehicle 10 is maintained within the set distance.

If the electronic control unit 39 determines Yes in step S3, the process proceeds to step S5. In step S5, the electronic control unit 39 controls the continuously variable transmission 15 to perform upshifting so that the requested engine rotational speed is limited by the set engine rotation speed and decreases the torque of the engine 11 on the basis of the limited requested engine rotational speed. The electronic control unit 39 then terminates the flowchart of FIG. 2. That is, the electronic control unit 39 performs control so that the engine rotational speed does not decrease to a value less than or equal to the set engine rotational speed when the continuously variable transmission 15 performs upshifting. An amount by which the torque of the engine 11 is decreased is set to a value corresponding to the decrease in engine rotational speed caused by the upshifting of the continuously variable transmission 15. Specifically, the decrease in torque of the engine 11 is determined from the torque of the engine 11 before upshifting of the continuously variable transmission 15 is performed, the engine rotational speed before the upshifting of the continuously variable transmission 15 is performed, the target engine rotational speed, and so forth. As the decrease in engine rotational speed becomes larger, the decrease in torque of the engine 11 is set to be larger.

Figure 3:
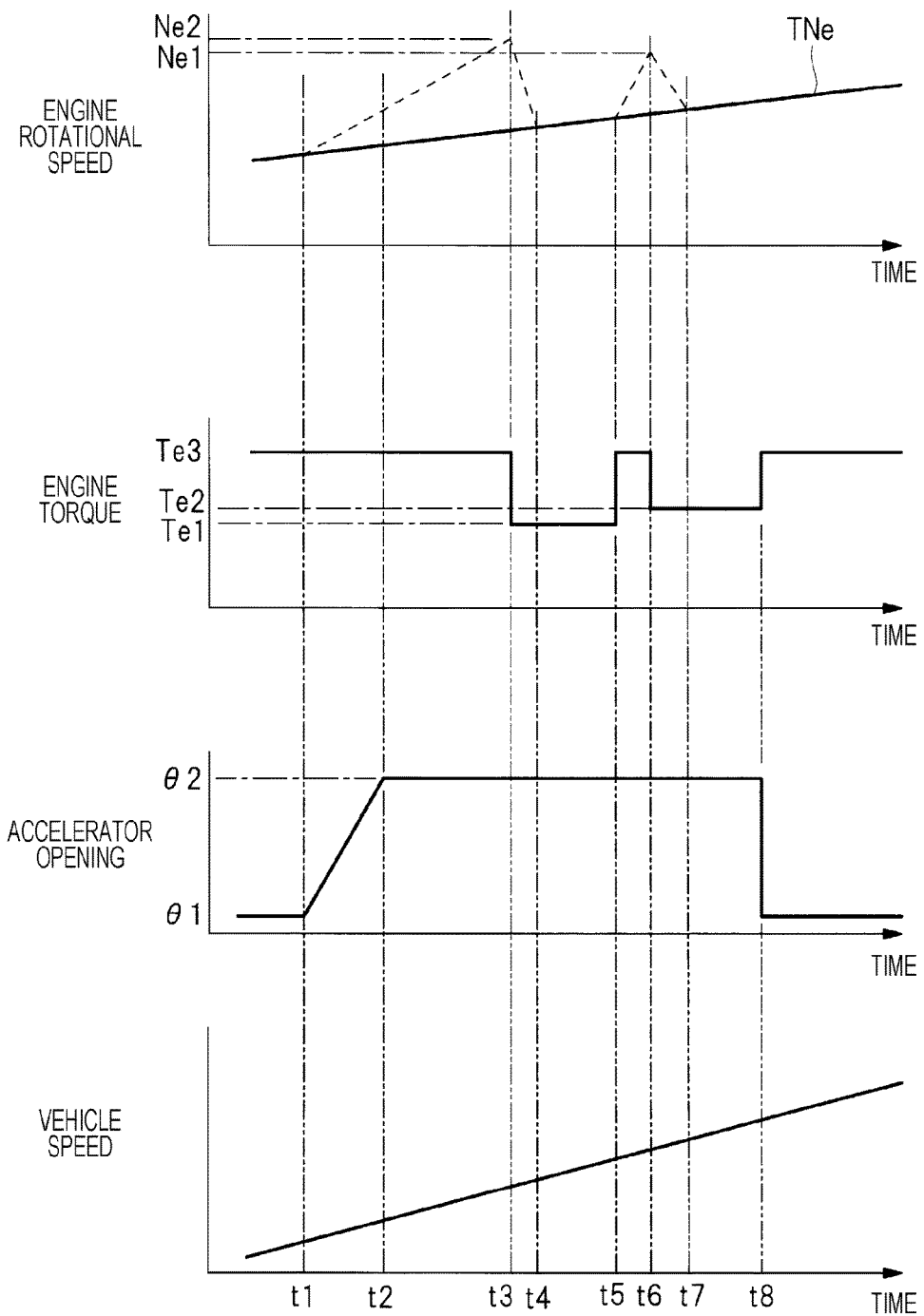
FIG. 3 is a time chart corresponding to a first control example performed by the electronic control unit.

A time chart illustrated in FIG. 3 corresponds to the first control example. Before and at time t1, the accelerator opening is maintained at a constant accelerator opening θ1 and the engine torque is controlled to be at a constant engine torque Te3. In addition, before and at time t1, the vehicle speed and the set engine rotational speed TNe are increasing. The requested engine rotational speed matches the set engine rotational speed TNe.

When the accelerator opening starts to increase at time t1, the requested engine rotational speed increases and consequently the engine rotational speed increases as indicated by a dash line. Accordingly, the engine rotational speed deviates from the set engine rotational speed TNe. Specifically, the engine rotational speed is higher than the set engine rotational speed TNe. At and after time t2, the accelerator opening is maintained at a constant accelerator opening θ2 but the vehicle speed and the engine rotational speed continue to increase. At time t3, upshifting of the continuously variable transmission 15 is started on the basis of the engine rotational speed of Net, the gear ratio of the continuously variable transmission 15, the accelerator opening θ2, and so forth. Consequently, the engine rotational speed decreases as indicated by the dash line.

At time t4, the engine rotational speed matches the set engine rotational speed TNe. The gear ratio of the continuously variable transmission 15 can be further decreased in accordance with the accelerator opening; however, the electronic control unit 39 prioritizes the set engine rotational speed TNe and restricts the further decrease in gear-ratio of the continuously variable transmission 15 after time t4 in the first control example. Since the accelerator opening is maintained at the accelerator opening θ2 also after time t4, the engine rotational speed becomes higher than the set engine rotational speed TNe at and after time t5. At time t6, upshifting of the continuously variable transmission 15 is started on the basis of the engine rotational speed of Net, the gear ratio of the continuously variable transmission 15, the accelerator opening θ2, and so forth. Consequently, the engine rotational speed decreases as indicated by the dash line.

At and after time t7, the engine rotational speed matches the set engine rotational speed TNe. The gear ratio of the continuously variable transmission 15 can be further decreased in accordance with the accelerator opening after time t7; however, the electronic control unit 39 prioritizes the set engine rotational speed TNe and restricts the further decrease in gear ratio of the continuously variable transmission 15 in the first control example. At and after time t8, the accelerator opening is returned to the accelerator opening θ1.

The engine torque is controlled to be constant at an engine torque Te3 from a time point before time t1 to time t3 and is controlled to be constant at an engine torque Te1, which is lower than the engine torque Te3, from time t3 to time t5. In addition, the engine torque is controlled to be constant at the engine torque Te3 for a period from time t5 to time t6 in which the engine rotational speed is higher than the set engine rotational speed TNe. Further, the engine torque is controlled to be at an engine torque Te2 from time t6 to time t8 and at the engine torque Te3 at and after time t8. The engine torque Te2 is lower than the engine torque Te3 and is higher than the engine torque Te1.

A difference between the engine torque Te3 and the engine torque Te1 corresponds to a first torque decrease amount by which the torque of the engine 11 is decreased in step S5. The electronic control unit 39 sets the first torque decrease amount in accordance with a difference between the engine rotational speed Net and the set engine rotational speed TNe at time t3. A difference between the engine torque Te3 and the engine torque Te2 corresponds to a second torque decrease amount by which the torque of the engine 11 is decreased in step S5. The electronic control unit 39 sets the second torque decrease amount in accordance with a difference between the engine rotational speed Net and the set engine rotational speed TNe at time t6.

As described above, when the electronic control unit 39 carries out the first control example, a torque decrease amount of the engine 11 is set in accordance with a change (i.e., decrease) in the engine rotational speed due to upshifting of the continuously variable transmission 15. Accordingly, a change in drive power produced at the drive wheels 12 is successfully reduced, and consequently the sense of pulling and the sense of jumping out are successfully suppressed. Accordingly, a variation in ride comfort of the vehicle 10 can be suppressed. In addition, in the case where the accelerator opening changes from the accelerator opening θ2 to the accelerator opening θ1 at time t8, the rate of change in the set engine rotational speed TNe is constant and smooth.

Second Control Example

Figure 4:
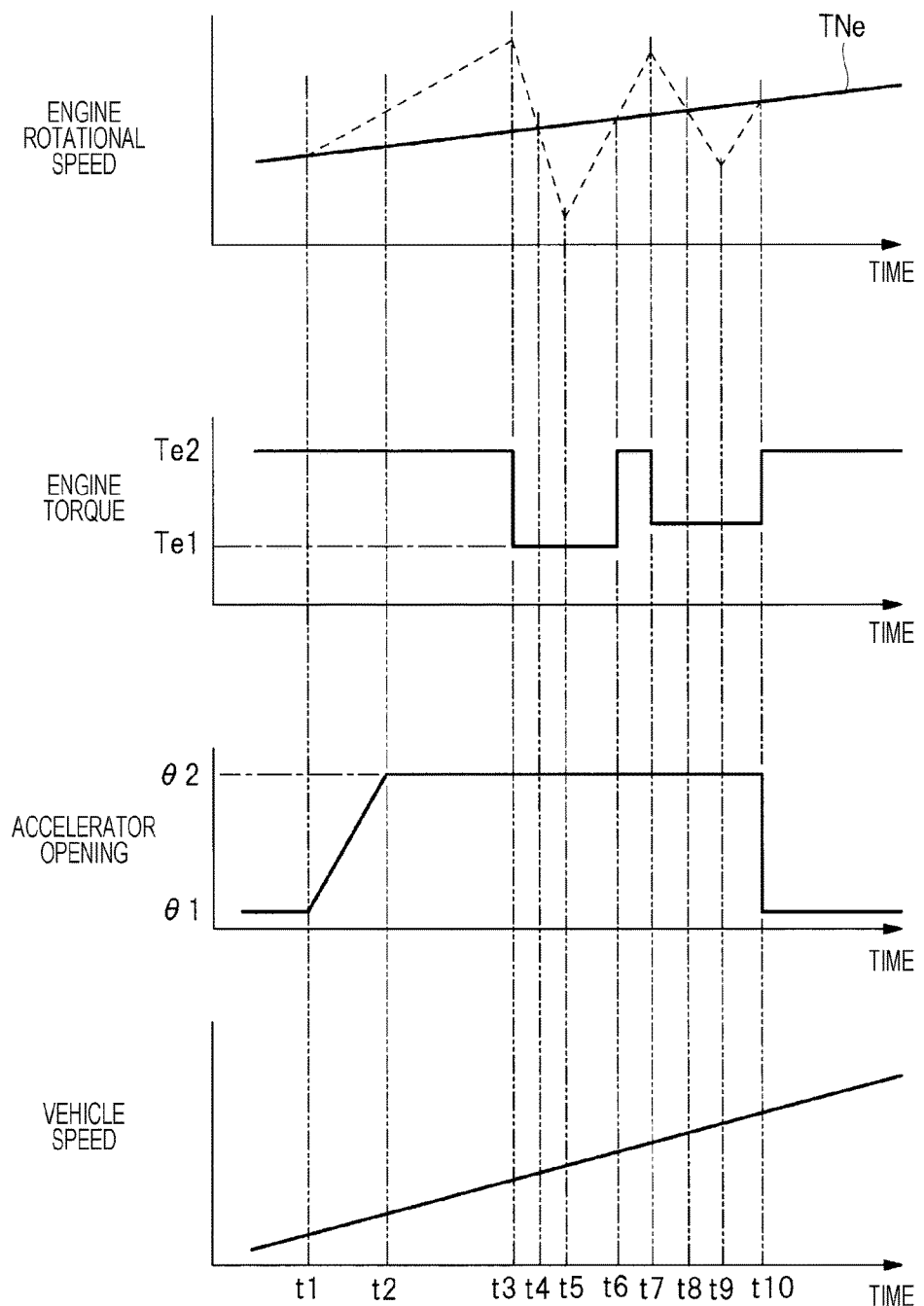
FIG. 4 is a time chart corresponding to a second control example performed by the electronic control unit.

A second control example is control in which the torque of the engine 11 is decreased together with upshifting of the continuously variable transmission 15 without limiting the requested engine rotational speed by the set engine rotational speed in step S5 of the flowchart of FIG. 2. FIG. 4 is a time chart corresponding to the second control example. The time chart illustrated in FIG. 4 is substantially the same as the time chart illustrated in FIG. 3 except that the engine torque is controlled to be constant at the engine torque Te2 before and at time t3. At time t3, upshifting is started by the continuously variable transmission 15 on the basis of the engine rotational speed, the gear ratio of the continuously variable transmission 15, the accelerator opening θ2, and so forth. Consequently, the engine rotational speed decreases as indicated by a dash line.

The engine rotational speed continues to decrease at an after time t4. The continuously variable transmission 15 finishes upshifting when the gear ratio becomes equal to the selected fixed gear ratio at time t5. Accordingly, the engine rotational speed increases in accordance with an increase in the vehicle speed at an after time t5.

The engine rotational speed matches the set engine rotational speed TNe at time t6 and continues to increase thereafter. At time t7, upshifting of the continuously variable transmission 15 is started on the basis of the engine rotational speed, the gear ratio, and the accelerator opening. Consequently, the engine rotational speed decreases as indicated by the dash line. The engine rotational speed becomes equal to or less than the set engine rotational speed TNe at and after time t8. The continuously variable transmission 15 finishes upshifting when the gear ratio becomes equal to the selected fixed gear ratio at time t9. Accordingly, the engine rotational speed increases in accordance with the increase in vehicle speed.

The accelerator opening is returned to the accelerator opening θ1 at time t10, and the engine rotational speed is maintained at the set engine rotational speed TNe. An amount by which the torque of the engine 11 is decreased from time t3 to time t6 differs from an amount by which the torque of the engine 11 is decreased from time t7 to time t10 in the time chart of FIG. 4. The amount by which the torque of the engine 11 is decreased changes in accordance with a change in the engine rotational speed, the engine torque, and the requested engine rotational speed. In the case where the electronic control unit 39 carries out the second control example, the requested engine rotational speed is not limited by the set engine rotational speed when the continuously variable transmission 15 performs automatic stepped shifting (i.e., upshifting). In addition, when the continuously variable transmission 15 performs upshifting, control is performed to decrease the engine torque together with control for decreasing the engine rotational speed. Thus, the sense of pulling and the sense of jumping out are successfully suppressed for the vehicle 10.

In one implementation, the engine 11 may serve as a "drive power source". A set of the electronic control unit 39 and the hydraulic control unit 38 may serve as each of a "first controller" and a "second controller". A set of the electronic control unit 39, the electronic throttle valve 17, the injector 18, and the spark plug 19 may serve as a "third controller". In addition, activation of the cruise control function may serve as "first speed control request". The set engine rotational speed TNe may serve as a "set rotational speed". An increase in the operation amount of the accelerator pedal may serve as a "second speed control request". The first speed control request may serve as a request for maintaining at least one of the traveling speed of the vehicle or the vehicle-to-vehicle distance between the preceding vehicle and the vehicle in a predetermined state. The second speed control request may serve as a request for increasing the traveling speed of the vehicle. The first speed control request and the second speed control request may differ from each other in terms of the technical meanings and in terms of the elements operated by the occupant of the vehicle.

The present invention is not limited to the examples, and various modifications can be made within a scope not departing from the essence of the present invention. Types of the operation member operated to input the second speed control request to the vehicle 10 include not only the accelerator pedal operated by the occupant of the vehicle 10 with their foot but also include a lever or knob operated by the occupant of the vehicle 10 with their hand. In this case, the electronic control unit 39 detects whether an operation amount of the lever or knob has increased in step S3. The drive power source is an engine that combusts fuel to produce motive power. Types of the engine not only include a gasoline engine but also include a diesel engine and a liquid petroleum gas engine. Further, types of the continuously variable transmission not only include a belt-type continuously variable transmission but also include a chain-type continuously variable transmission, a continuously variable transmission with a planetary pinion mechanism, and a toroidal continuously variable transmission. Each of the first to third controllers may be a single electronic component or a set of a plurality of electronic components. That is, each of the first to third controllers may include a controller, a processor, a module, a unit, or a circuit. The drive wheels include at least one set of front wheels or rear wheels. Further, the vehicle 10 need not be equipped with the motor-generator 34. That is, the vehicle 10 need not be a hybrid vehicle.

The time charts of FIGS. 3 and 4 illustrate the case where the vehicle speed increases; however, the electronic control unit 39 can carry out the first and second control examples when the vehicle speed is constant or when the vehicle speed decreases.

The electronic control unit 39 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the electronic control unit 39. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the non-volatile memory may include a ROM and an NVRAM. The ASIC is an integrated circuit (IC) customized to perform, and the FPGA is an integrated circuit designed to be configured after manufacturing in order to perform, all or a part of the functions of the electronic control unit 39 illustrated in FIG. 1.

The invention claimed is:

1. A control device for a continuously variable transmission configured to continuously change a gear ratio, the continuously variable transmission being disposed between a drive power source and drive wheels of a vehicle, the drive power source being configured to transmit motive power to the drive wheels, the control device comprising:
- a first controller configured to control, in response to a first speed control request for controlling a traveling speed of the vehicle for a predetermined state, the gear ratio of the continuously variable transmission such that a rotational speed of the drive power source approaches a set rotational speed;
- a second controller configured to control, in response to a second speed control request that is different from the first speed control request and is issued while the first controller is controlling the gear ratio of the continuously variable transmission in accordance with the first speed control request, the gear ratio of the continuously variable transmission on the basis of the rotational speed of the drive power source and the gear ratio of the continuously variable transmission; and
- a third controller configured to change, when the rotational speed of the drive power source changes as a result of the second controller controlling the gear ratio of the continuously variable transmission, torque of the drive power source on the basis of torque of the drive power source before the gear ratio of the continuously variable transmission is changed, the rotational speed of the drive power source before the gear ratio of the continuously variable transmission is changed, and a target rotational speed of the drive power source.

2. The control device according to claim 1, wherein
the first speed control request comprises a request for controlling one or both of the traveling speed of the vehicle or a vehicle-to-vehicle distance between the vehicle and a preceding vehicle for the predetermined state, and
the second speed control request comprises a request for increasing the traveling speed of the vehicle.

3. The control device according to claim 1, wherein
the second controller performs control for decreasing the gear ratio of the continuously variable transmission such that the rotational speed of the drive power source does not decrease to a value lower than or equal to the set rotational speed, and
the third controller decreases the torque of the drive power source on the basis of the torque of the drive power source before upshifting of the continuously variable transmission is performed, the rotational speed of the drive power source before the upshifting of the continuously variable transmission is performed, and the target rotational speed of the drive power source.

4. The control device according to claim 2, wherein
the second controller performs control for decreasing the gear ratio of the continuously variable transmission such that the rotational speed of the drive power source does not decrease to a value lower than or equal to the set rotational speed, and
the third controller decreases the torque of the drive power source on the basis of the torque of the drive power source before upshifting of the continuously variable transmission is performed, the rotational speed of the drive power source before the upshifting of the continuously variable transmission is performed, and the target rotational speed of the drive power source.

5. A control device for a continuously variable transmission configured to continuously change a gear ratio, the continuously variable transmission being disposed between a drive power source and drive wheels of a vehicle, the drive power source being configured to transmit motive power to the drive wheels, the control device comprising:
circuitry configured to
control, in response to a first speed control request for controlling a traveling speed of the vehicle for a predetermined state, the gear ratio of the continuously variable transmission such that a rotational speed of the drive power source approaches a set rotational speed,
control, in response to a second speed control request that is different from the first speed control request and is issued while a first controller is controlling the gear ratio of the continuously variable transmission in accordance with the first speed control request, the gear ratio of the continuously variable transmission on the basis of the rotational speed of the drive power source and the gear ratio of the continuously variable transmission, and
change, when the rotational speed of the drive power source changes as a result of a second controller controlling the gear ratio of the continuously variable transmission, torque of the drive power source on the basis of torque of the drive power source before the gear ratio of the continuously variable transmission is changed, the rotational speed of the drive power source before the gear ratio of the continuously variable transmission is changed, and a target rotational speed of the drive power source.

* * * * *